United States Patent [19]

Setala et al.

[11] Patent Number: 5,002,252
[45] Date of Patent: Mar. 26, 1991

[54] POST STABILIZER

[76] Inventors: James E. Setala, 1177 Koontz Rd., Chehalis, Wash. 98532; George Spector, 233 Broadway RM 3615, New York, N.Y. 10007

[21] Appl. No.: 875,940
[22] Filed: Jun. 19, 1986
[51] Int. Cl.⁵ .............................................. F16M 13/00
[52] U.S. Cl. .................................. 248/533; 248/523; 248/528
[58] Field of Search ............... 248/165, 166, 168, 527, 248/316.5, 313, 530–533, 528, 529, 523

[56] References Cited

U.S. PATENT DOCUMENTS

| | | | |
|---|---|---|---|
| 1,217,606 | 2/1917 | Kane | 248/676 |
| 3,036,749 | 5/1962 | Evans | 248/313 |
| 3,066,904 | 12/1962 | Cook | 248/62 |
| 3,452,956 | 7/1969 | Reed | 248/539 |
| 3,618,111 | 11/1971 | Vaughn | 248/166 |
| 4,225,104 | 9/1980 | Larson | 248/316.5 |
| 4,438,896 | 3/1984 | Hall | 248/168 |

FOREIGN PATENT DOCUMENTS

| | | | |
|---|---|---|---|
| 31385 | 8/1911 | Austria | 248/230 |
| 471751 | 1/1929 | Fed. Rep. of Germany | 248/166 |
| 1798 | 7/1910 | United Kingdom | 248/230 |
| 488751 | of 1938 | United Kingdom | 248/527 |
| 602159 | 5/1948 | United Kingdom | 248/316.5 |

Primary Examiner—Alvin C. Chin-Shue

[57] ABSTRACT

A post stabilizer is provided and consists of a collar placed around a post. Telescopic support legs are pivotly mounted to the collar to properly elevate the collar. Stakes through feet of the legs secure the legs to the ground for stabilizing the post.

2 Claims, 1 Drawing Sheet

POST STABILIZER

BACKGROUND OF THE INVENTION

The instant invention relates generally to holders and more specifically it relates to a post stabilizer.

Numerous holders have been provided in prior art that are adapted to furnish firm bases for christmas trees or any pole-like objects which are required to stand on end. For example, U.S. Pat. No. 1,551,093; 1,689,050 and 2,485,819 all are illustrative of such prior art. While these units may be suitable for the particular purpose to which they address, they would not be as suitable for the purpose of the present invention as heretofore described.

SUMMARY OF THE INVENTION

A primary object of the present invention is to provide a post stabilizer that will overcome the shortcomings of the prior art devices.

Another object is to provide a post stabilizer that includes telescopic legs that can be secured to the ground with stakes.

An additional object is to provide a post stabilizer that has the necessary strength and size to accommodate all shapes and sizes of posts.

A further object is to provide a post stabilizer that is economical in cost to manufacture.

A still further object is to provide a post stabilizer that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
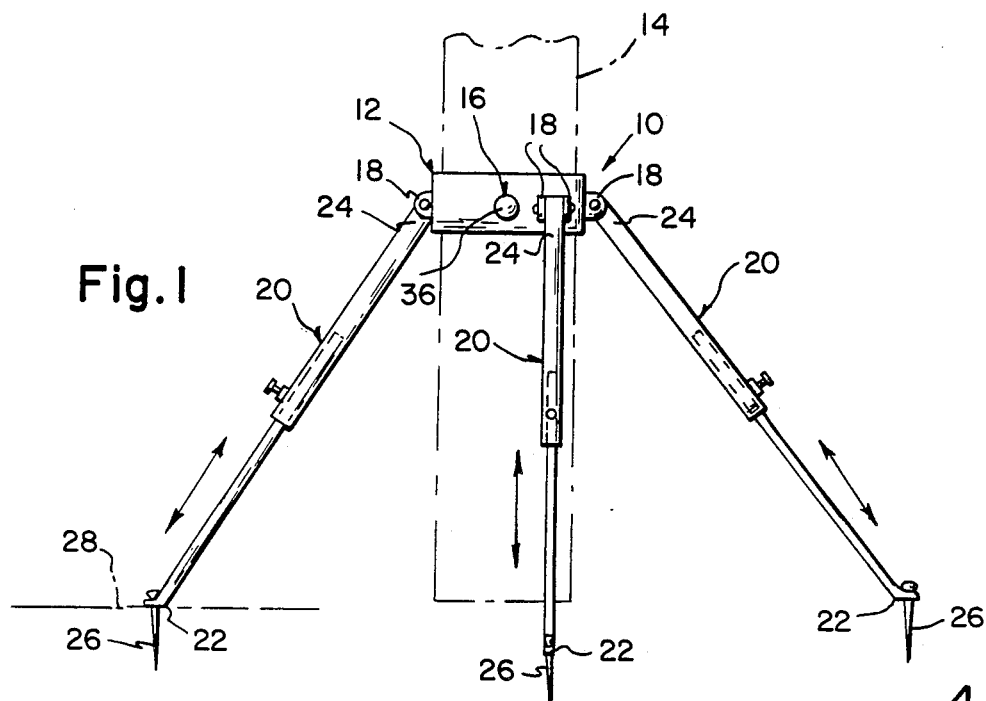
FIG. 1 is a side elevational view of the invention.
Figure 2:
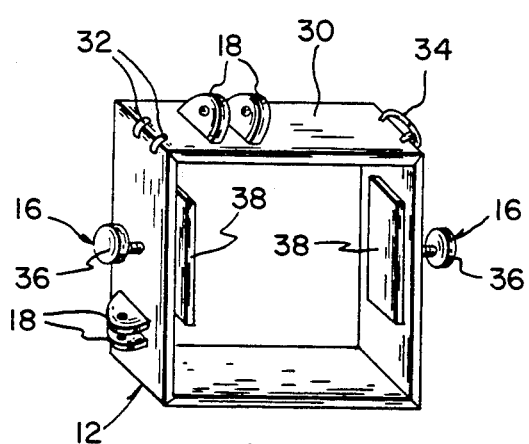
FIG. 2 is a perspective view of the square clamp member thereof.

Turning now descriptively to the drawings, in which similar reference characters denote similar elements throughout the several views, FIGS. 1 and 2 illustrates a post stabilizer 10 that consists of a collar 12 adapted to be placed around a post 14. Two devices 16 are carried by the collar 12 for releasably holding the post 14 within the collar. Three laterally directed pairs of ears 18 are secured to the collar 12. Three telescopic support legs 20 are provided. Each of the legs 20 have a foot 22 at distal end thereof with proximal end 24 pivotly mounted between one of the pairs of ears 18. The legs 20 are adapted to be adjustably spread out so that the collar 12 can be properly elevated to form a firm base for the post 14. A stake 26 is carried by each foot 22 of each leg 20 for attaching the legs to the ground 28 for stabilizing the post 14.

The collar 12 is box shaped with one side 30 pivotly hinged at 32 and locked at 34 thereto so that the collar can be easily placed around the post 14. Each device 16 consists of a set screw 36 threadably passing through one fixed side of the collar 12. A flat adjustment plate 38 is rotatably affixed to distal end of the set screw 36 so that when the set screw is turned the plate 38 will bear against the post 14.

Figure 3:
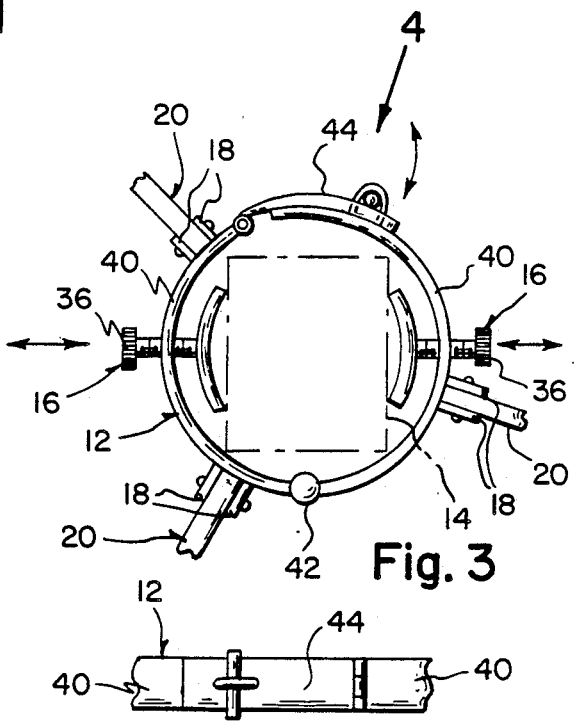
FIG. 3 is a top view of a modification being a circular clamp member.
Figure 4:
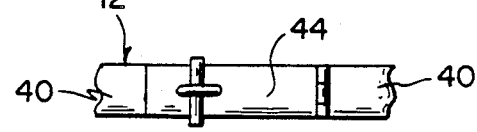
FIG. 4 is a partial side view taken in the direction of numeral 4 in FIG. 3 showing the hasp thereon.

FIGS. 3 and 4 show modifications thereof. The collar 12 is ring shaped and is composed to two arcuate sections 40 pivotly connected at one end 42. A locking hasp 44 is at other end of the arcuate sections 40 so that the collar 12 can be easily placed around the post 14. Each device 16 consists of a set screw 36 threadably passing through one of the arcuate sections 40 of the collar 12. A curved adjustment plate 46 is rotatably affixed to distal end of the set screw 36 so that when the set screw is turned the plate 46 will bear against the post 14. The post can be round, square, rectangular or any other geometric shape in cross section.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A post stabilizer comprising:
   (a) a continuous collar adapted to be placed around a post, wherein said collar has a pivotal locking latch;
   (b) means carried by said collar for releasably holding said post within said collar;
   (c) a plurality of exterior outwardly directed pairs of ears secured on said collar;
   (d) a plurality of telescopic support legs, each of said legs having a foot at distal end thereof with proximal end pivotly mounted between one of said pairs of ears, said legs adapted to be adjustably spread out so that said collar can be properly elevated to form a firm base for said post;
   (e) a plurality of stakes, each said stake carried by one of said feet of one of said legs for attaching said legs to the ground for stabilizing said post, wherein said locking latch has one side hinged at one end and releasably locked at an opposite end to the collar so that said collar can be easily placed around said post, wherein said releaseably holding means comprises:
   (f) a pair of opposing set screws threadably passing through opposite sides of said collar;
   (g) an adjustment plate rotatably affixed to the distal ends of said set screws so that when said set screws are turned said plates will bear against said post, wherein:
   (h) said collar is ring-shaped and composed of arcuate sections pivotly connected at one pair of ends; and
   (i) said locking latch at the ends of said arcuate sections.

2. A post stabilizer as in claim 1, wherein said means retains said post concentrically in said collar.

* * * * *